(12) United States Patent
Lee

(10) Patent No.: US 10,991,339 B1
(45) Date of Patent: Apr. 27, 2021

(54) SYSTEM AND METHOD FOR INCREASING LIGHT UNIFORMITY FOR A DISPLAY BACKLIGHT

(71) Applicant: Facebook Technologies, LLC, Menlo Park, CA (US)

(72) Inventor: Agnes Lee, Saratoga, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/697,075

(22) Filed: Nov. 26, 2019

(51) Int. Cl.
*G02B 5/02* (2006.01)
*G09G 5/10* (2006.01)
*G02F 1/13357* (2006.01)
*G02B 27/01* (2006.01)

(52) U.S. Cl.
CPC ......... *G09G 5/10* (2013.01); *G02F 1/133603* (2013.01); *G02F 1/133606* (2013.01); *G02B 27/0172* (2013.01); *G02B 2027/0138* (2013.01); *G02B 2027/0178* (2013.01); *G09G 2320/0233* (2013.01); *G09G 2320/0626* (2013.01)

(58) Field of Classification Search
CPC ..... G02B 5/0268; G02B 5/0263; G02B 5/021
See application file for complete search history.

(56) References Cited

U.S. PATENT DOCUMENTS

| | | | | |
|---|---|---|---|---|
| 3,241,256 A * | 3/1966 | Viret | ....................... | G09F 13/04 40/546 |
| 4,985,809 A * | 1/1991 | Matsui | .................. | G02B 6/0041 362/624 |
| 5,057,974 A * | 10/1991 | Mizobe | ................. | G02B 6/0041 362/23.15 |
| 5,384,658 A * | 1/1995 | Ohtake | ....................... | C08J 7/02 359/599 |
| 5,390,436 A * | 2/1995 | Ashall | .................. | G02B 6/0043 40/546 |
| 5,408,387 A * | 4/1995 | Murase | ............ | B29D 11/00278 362/623 |
| 5,921,651 A * | 7/1999 | Ishikawa | .............. | G02B 6/0065 362/23.15 |
| 5,947,578 A * | 9/1999 | Ayres | .................... | G02B 6/0021 362/255 |
| 6,900,941 B2 | 5/2005 | Kaminsky | | |
| 7,436,469 B2 | 10/2008 | Gehlsen | | |
| 7,651,241 B2 * | 1/2010 | Lee | ....................... | G02B 5/0263 362/223 |
| 8,057,066 B2 * | 11/2011 | Joo | ....................... | G02B 5/0215 362/246 |
| 8,827,480 B2 * | 9/2014 | Kuromizu | ............ | G02B 5/0263 362/97.2 |
| 2011/0085241 A1 * | 4/2011 | Purchase | .............. | G02B 5/0215 359/599 |
| 2014/0357012 A1 * | 12/2014 | Toriyama | ............. | G02B 5/0268 438/71 |

\* cited by examiner

*Primary Examiner* — Ismael Negron
(74) *Attorney, Agent, or Firm* — Freestone Intellectual Property Law PLLC; Aaron J. Visbeek

(57) ABSTRACT

A display backlight includes an illumination layer and an optical layer. The illumination layer includes a two-dimensional array of light sources, which generate illumination light. An image of the illumination light is captured and analyzed for light uniformity. In response to the analysis of the illumination light, ink patterns are printed on the optical layer of a display backlight to increase light uniformity of the illumination light.

24 Claims, 6 Drawing Sheets

SYSTEM AND METHOD FOR INCREASING LIGHT UNIFORMITY FOR A DISPLAY BACKLIGHT

BACKGROUND INFORMATION

Various technologies such as liquid crystal, micromirrors, and organic light-emitting diodes (OLEDs) are utilized in displays. Displays are utilized as televisions, computer monitors, mobile device screens, and otherwise. Different display technologies may be utilized depending on the context and different performance metrics are more important in various contexts. Example display performance metrics include refresh rate, viewing angle, pixel density, contrast ratio, and brightness uniformity.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
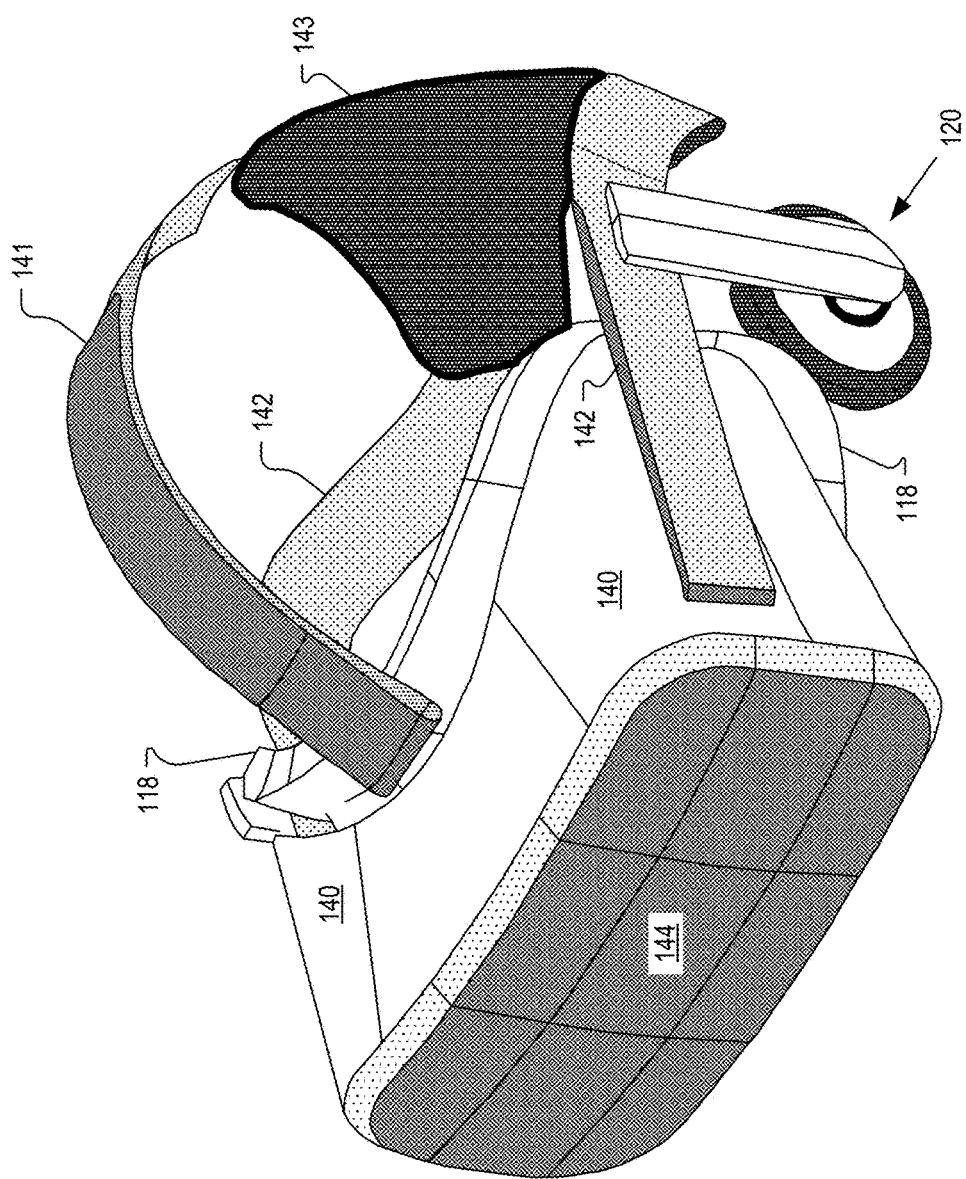
FIG. 1 illustrates an example head mounted display (HMD) that may include a display having a display backlight, in accordance with an embodiment of the disclosure.

Embodiments of a display backlight including an optical layer for increasing brightness uniformity are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The apparatus, system, and method for increasing display backlight uniformity described in this disclosure include printing ink patterns on an optical layer of a display backlight. In some display architectures, light-emitting diodes (LEDs) are utilized to provided illumination light to illuminate a spatial light modulator (SLM) such as a liquid crystal display (LCD). In some examples, a two-dimensional array of LEDs is configured to illuminate an LCD in an arrangement that may be considered a "direct-lit backlight."

LEDs with the same manufacturer part number may vary in brightness (intensity) and/or color due to various manufacturing differences such as a position of a particular die of the LED was in the wafer that produced the LED die. This variance can be partially mitigated by buying LEDs that are "binned" with respect to brightness and/or color so that the LED brightness and/or color is more tightly controlled in the purchasing process. However, purchasing binned LEDs is much more expensive and only partially mitigates variances in brightness and/or color. Thus, when LEDs are utilized in backlights for displays, brightness and/or color uniformity across the display may be inconsistent such that inconsistencies are noticeable in images presented by the display. Furthermore, even when LEDs in a two-dimensional array of LEDs for a direct-lit backlight have similar brightness, brightness hot spots may still be noticeable directly over an LED compared to dimmer zone in between the LEDs in the two-dimensional array.

In embodiments of the disclosure, an optical layer such as a diffuser that is disposed over an array of LEDs is printed with ink patterns that increase light uniformity with respect to brightness and/or color emitted by the LEDs in a display backlight. The optical layer may also be a quantum dot film, a lightguide, or a prism film. A printed ink pattern may be printed on the optical layer so that a particular printed ink pattern is disposed over a particular LED to increase light uniformity across the display backlight. In an implementation, a camera captures an image of an illumination layer of a display backlight and a printing apparatus prints ink patterns (based on the image) on a diffuser layer to increase the light uniformity of the backlight. Each ink pattern may correspond to an LED in a two-dimensional array of LEDs. These and other embodiments are described in more detail in connections with FIGS. 1-5.

FIG. 1 illustrates an example head mounted display (HMD) 100 that may include a display having a backlight that increases light uniformity of the display, in accordance with an embodiment of the disclosure. Example head mounted display (HMD) 100 includes a top structure 141, a rear securing structure 143, and a side structure 142 attached with a viewing structure 140 having a front rigid body 144. The illustrated HMD 100 is configured to be worn on a head of a user of the HMD. In one embodiment, top structure 141 includes a fabric strap that may be elastic. Side structure 142 and rear securing structure 143 may include a fabric as well as rigid structures (e.g. plastics) for securing HMD 100 to the head of the user. HMD 100 may optionally include earpiece(s) 120 configured to deliver audio to the ear(s) of a wearer of HMD 100.

In the illustrated embodiment, viewing structure 140 includes an interface membrane 118 for contacting a face of a wearer of HMD 100. Interface membrane 118 may function to block out some or all ambient light from reaching the eyes of the wearer of HMD 100.

Example HMD 100 also includes a chassis for supporting hardware of the viewing structure 140 of HMD 100. Hardware of viewing structure 140 may include any of processing logic, wired and/or wireless data interface for sending and receiving data, graphic processors, and one or more memories for storing data and computer-executable instructions. In one embodiment, viewing structure 140 may be configured to receive wired power. In one embodiment, viewing structure 140 is configured to be powered by one or more batteries. In one embodiment, viewing structure 140 may be configured to receive wired data including video data. In one embodiment, viewing structure 140 is configured to receive wireless data including video data.

Viewing structure 140 may include a display for directing image light to a wearer of HMD 100. The display may include an LCD for directing image light to a wearer of HMD 100. Since a display included in HMD 100 is disposed so close to the eye of a wearer and potentially magnified by viewing optics, light uniformity of the display may be particularly important when compared to a television or a computer monitor where the viewing distance of a viewer is much farther away with the larger form-factor.

Figure 2A:
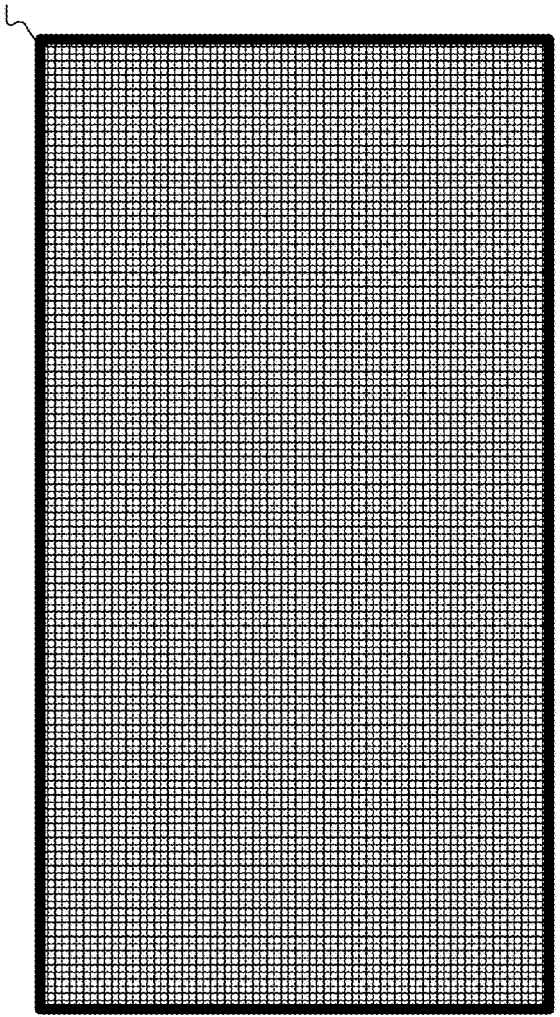
FIGS. 2A and 2B illustrate a display having a display backlight illuminating a spatial light modulator (SLM), in accordance with an embodiment of the disclosure.
Figure 2B:
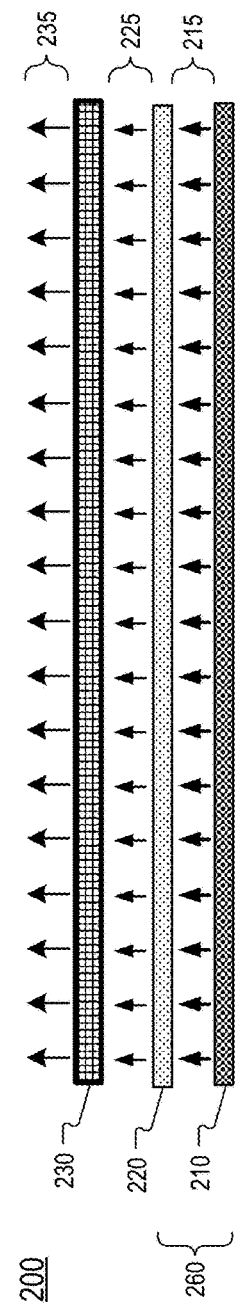

FIGS. 2A and 2B illustrate a display 200 having a display backlight 260 illuminating a spatial light modulator (SLM) 230, in accordance with an embodiment of the disclosure. FIG. 2A illustrates a front view of display 200 and FIG. 2B illustrates an exploded view from a side perspective of display 200. Display 200 may be a liquid crystal display (LCD) and SLM 230 may be a liquid crystal display pixel array. In FIG. 2B, illumination layer 210 emits illumination light 215. Illumination layer 210 may include a two-dimensional array of light sources such as the array of light sources 313 illustrated in FIG. 3A. Referring back to FIG. 2B, display 200 includes a display backlight 260 that includes illumination layer 210 and optical layer 220. Optical layer 220 may include one or more diffuser films. Optical layer 220 may optionally include a polarization layer that passes a first polarization orientation of illumination light 215 while blocking (absorbing or reflecting) a second polarization orientation of illumination light 215. Refined illumination light 225 from optical layer 220 illuminates SLM 230. One or more images are driven onto SLM 230 so that SLM 230 generates image light 235 of display 200.

Figure 3A:
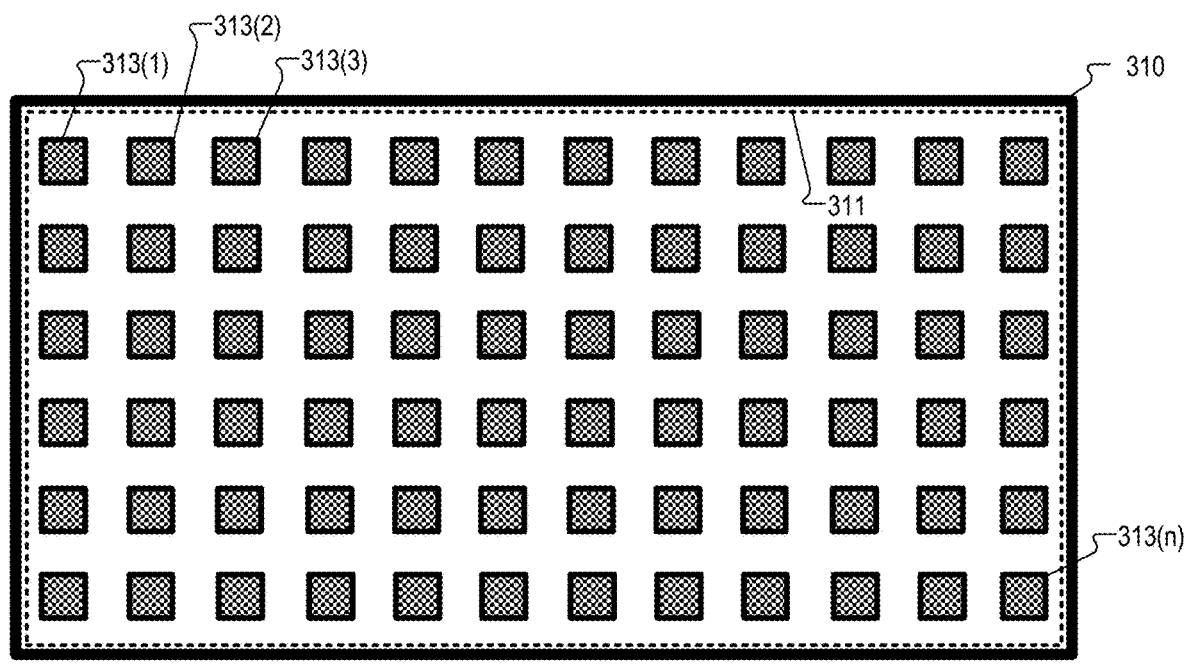
FIGS. 3A-3C illustrate an example illumination layer and an example optical layer including ink patterns, in accordance with an embodiment of the disclosure.

FIG. 3A illustrates an example illumination layer 310 that may be utilized as illumination layer 210, in accordance with embodiments of the disclosure. FIG. 3A illustrates a two-dimensional array of light sources 313 that illuminate a two-dimensional illumination area 311 (depicted with dashed line) with illumination light. The light sources of the two-dimensional array of light sources may be LEDs. The LEDs may be disposed in the same plane on one or more printed circuit boards (PCBs) that are designed to include heat sinking features to draw heat from the LEDs. The PCB board(s) may be bonded to an aluminum backplane for heat sinking purposes, for example. The LEDs may be white LEDs configured to emit white light. The LEDs may include an LED die configured to emit blue light with a yellow phosphor disposed over the LED die configured to emit the blue light where the blue light illuminating the yellow phosphor generates illumination light over a white light spectrum. The LEDs may be configured to emit blue light when the LEDs illuminate a quantum dot film to generate white light.

The array of light sources 313 includes light sources 313(1), 313(2), 313(3) . . . through 313(n), where n is an integer number. In the illustrated embodiment of FIG. 3A, integer number n is 72 and the two-dimensional array of light sources 313 is arranged in a 6×12 matrix where the light sources 313 are arranged in a grid. In other embodiments, the light sources 313 may not necessarily be arranged in a grid pattern where the light sources are equally spaced. Integer number n may be an odd number or an even number. Integer number n may be any number. For example, the integer number n of the array of light sources may be 512 where the light sources are arranged in a 16×32 grid. Of course, integer number n may be other numbers in other embodiments.

Figure 3B:
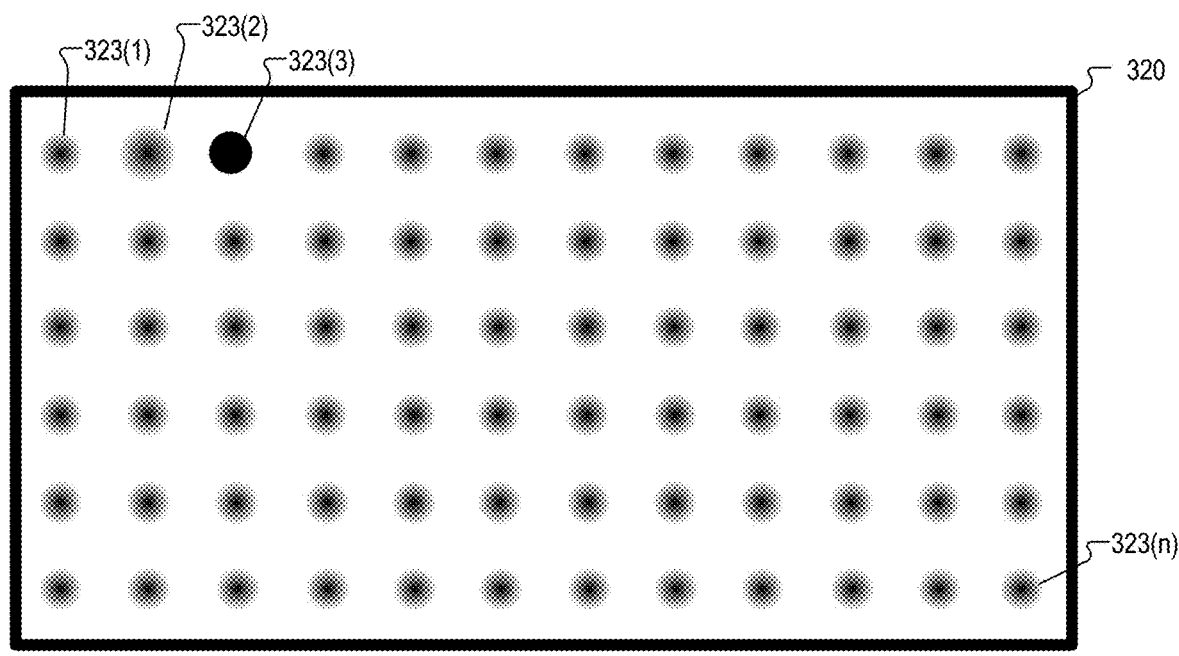
Figure 3C:
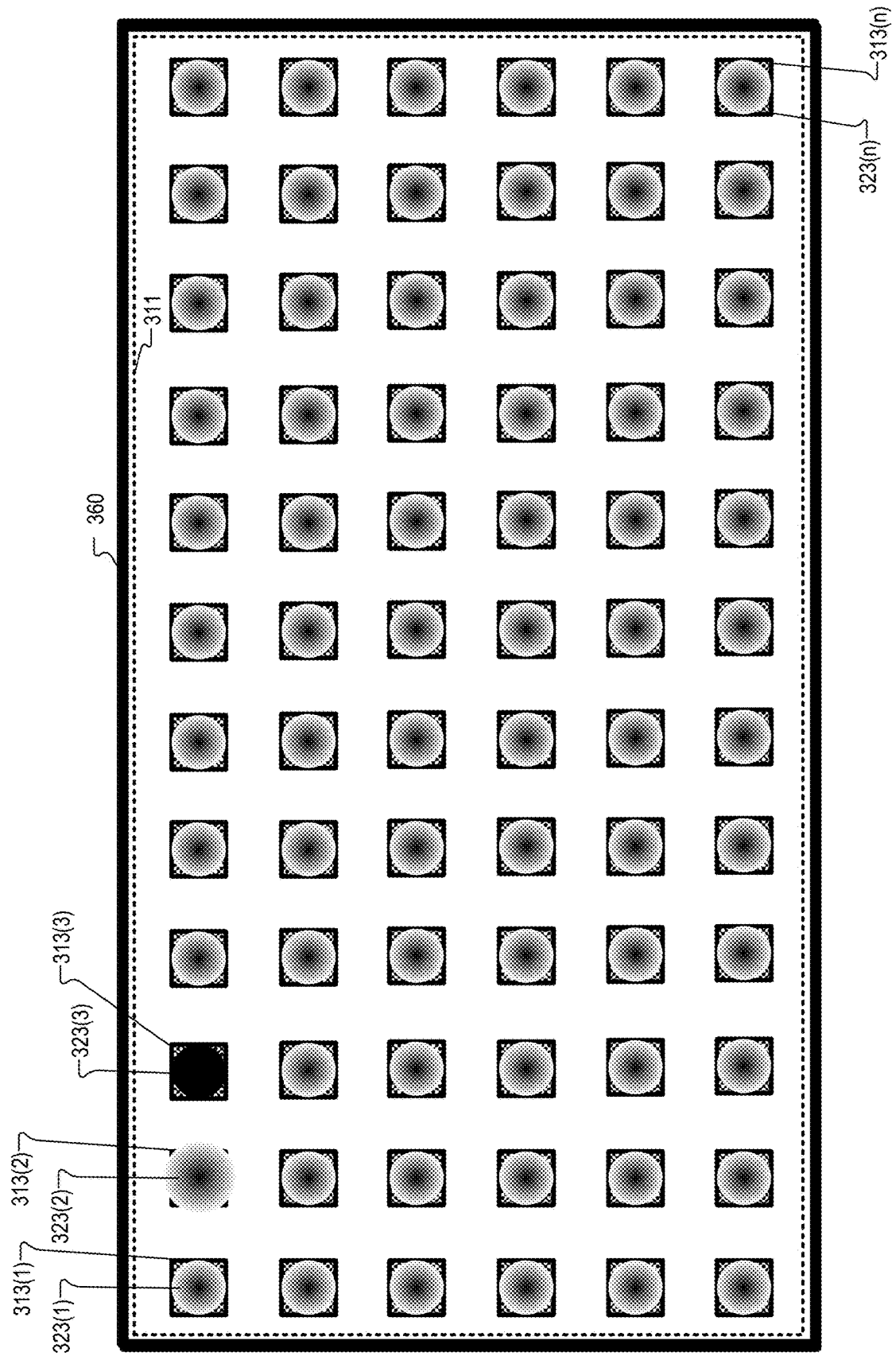

FIG. 3B illustrates an example optical layer 320 that includes an array of ink patterns 323 patterned on optical layer 320 to increase light uniformity across a two-dimensional illumination area, in accordance with an embodiment of the disclosure. Optical layer 320 may be placed over illumination layer 310 to form a display backlight such as display backlight 260. The array of ink patterns 323 includes ink patterns 323(1), 323(2), 323(3) . . . through 323(n), where n is an integer number. In some embodiments, there is a one-to-one correspondence between ink patterns 323 and light sources 313 so the integer number n of ink patterns 323 is the same as the integer number n of light sources 313. Each ink pattern 323 may be disposed over and matched to a corresponding light source 313, as shown in FIG. 3C. Each ink pattern 323 on optical layer 320 may be configured so the brightness of each light source 313 is the same or similar, when viewed through optical layer 320. Each ink pattern 323 on optical layer 320 may be configured so the color of illumination light emitted by each light source 313 is homogenized, when viewed through optical layer 320. Each ink pattern 323 on optical layer 320 may be configured so the color of illumination light emitted by each light source 313 is homogenized and the brightness of the illumination light from each light source 313 is homogenized, when viewed through optical layer 320.

The brightness of each light source 313 (when viewed through optical layer 320) may be modulated by the quantity of ink in a particular ink pattern 323 and/or the size/expanse of the particular ink pattern 323. The quantity of ink in each ink pattern 323 may be increased as a function of the brightness of a particular light source 313 that the ink pattern is disposed over. In this way, an ink pattern with a higher quantity of ink may be printed on optical layer 320 to reduce a bright-spot caused by a particular light source that is brighter than other light sources in the array of light sources 313.

The brightness of each light source 313 (when viewed through optical layer 320) may be modulated by the quantity of ink in a particular ink pattern 323 and/or the size/expanse of the particular ink pattern 323. The quantity of ink in each ink pattern 323 may be increased as a function of the brightness of a particular light source 313 that the ink pattern 323 is disposed over. In one embodiment, the light sources 313 are blue LEDs that emit blue light and the ink patterns 323 are a yellow phosphor that emits white light when excited by the blue light of the blue LEDs. In this case, the quantity of the yellow phosphor in the ink pattern 323 is modulated to homogenize the brightness uniformity of the refined illumination light over the two-dimensional illumination area. For example, increasing a quantity of yellow phosphor in an ink pattern may increase the intensity of refined illumination light 225 for a particular coordinate in the two-dimensional illumination area and decreasing the quantity of yellow phosphor in an ink pattern 323 may decrease the intensity of refined illumination light 225 for a particular coordinate in the two-dimensional illumination area.

The color spectrum of each light source 313 (when viewed through optical layer 320) may be modulated for color uniformity by the quantity of ink in a particular ink pattern 323 and/or the color of ink in a particular ink pattern 323. If a light source 313 is emitting a higher brightness of red-wavelength light, for example, an ink pattern 323 may include ink that absorbs red-wavelength light to modulate the color (or color spectrum) of illumination light that becomes refined illumination light 225. The quantity of a particular color-absorbing ink may be increased as needed to attenuate the brightness of the emitted light for a particular wavelength of light emitted by a particular light source 313 that the ink pattern 323 is disposed over. In an embodiment, a compensation color ink is added to bring refined illumination light 225 back toward a white light color target. In one example a blue compensation ink is included in the ink pattern to compensate to bring a yellowish refined illumination light 225 back toward the white light color target.

FIG. 3C illustrates optical layer 320 including ink patterns 323(1)-(*n*) disposed over light sources 313(1)-313(*n*) in display backlight 360. FIG. 3C illustrates that the size of a particular ink pattern may vary and the quantity of ink in a particular ink pattern may vary to increase light uniformity of the light emitted by display backlight. For example, ink pattern 323(2) is larger than ink pattern 323(1). In particular, the radius of ink pattern 323(2) is greater than a radius of ink pattern 323(1). The shape of the ink patterns may be other than circular, in different embodiments. A larger ink pattern (e.g. 323(2)) may reduce a bright-spot in display backlight 360 by attenuating a light source (e.g. 313(2)) that is brighter than another light source (e.g. 313(1)) that has a smaller ink pattern (e.g. 323(1)) disposed over that light source.

Ink pattern 323(3) in FIG. 3C illustrates that a quantity or color of a particular ink pattern may vary to modulate the brightness and/or color of light. Ink pattern 323(3) is darker than ink pattern 323(1), for example and thus the brightness of illumination light from light source 313(3) is attenuated more than light source 313(1). If ink pattern 323(3) includes color-absorbing ink the quantity or color of ink pattern 323(3) can also modulate color uniformity of display backlight 360 by absorbing a higher-than-usual intensity for a particular wavelength band where light source 313(3) emits a higher-than-normal brightness within that particular wavelength band. A compensation color ink may be added in an ink pattern to balance the color. For example, if LED light is yellowish, the density of blue ink for color compensation may be adjusted higher or a deeper blue ink may be utilized. Of course, the illustrated examples of ink patterns 323 are merely examples and the shape of the ink patterns and the placement of the ink patterns may vary in different implementations to increase light uniformity for display backlight 360 with respect to brightness uniformity and/or color uniformity.

In an embodiment, light sources 313 include LEDs configured to emit blue illumination light and the optical layer 320 includes quantum dots to be excited by the blue illumination light. When the quantum dots are excited by the blue illumination light, the quantum dots are configured to emit white light. In this case, illumination light 215 is blue light and refined illumination light 225 is white light emitted by the quantum dots. In some embodiments, the quantum dots are printed on to the optical layer 320 as ink patterns to increase light uniformity.

Figure 4:
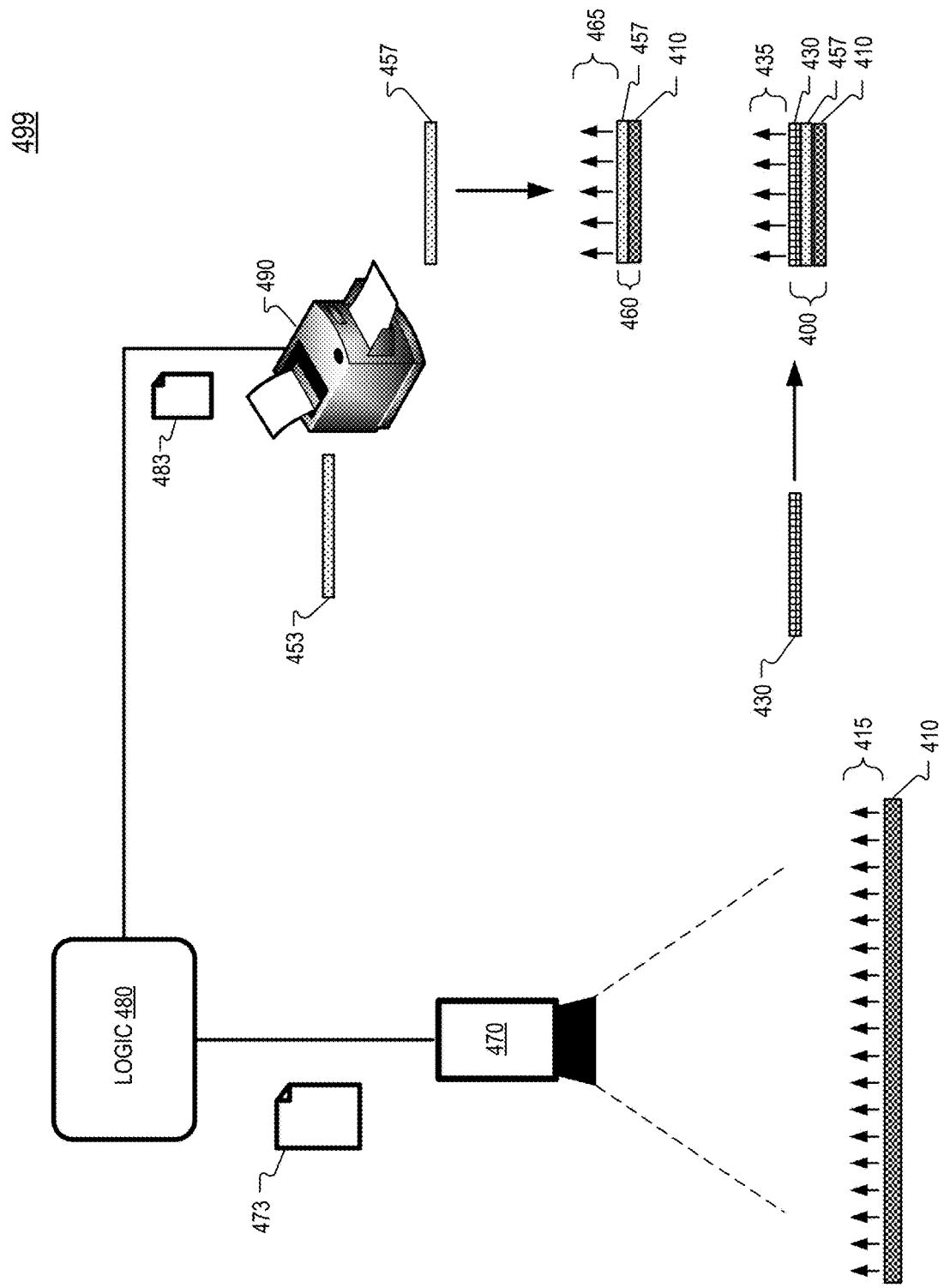
FIG. 4 illustrates an example system for increasing light uniformity in display backlights, in accordance with an embodiment of the disclosure.

FIG. 4 illustrates an example system 499 for increasing light uniformity in display backlights, in accordance with an embodiment of the disclosure. System 499 may be used in a fabrication context to fabricate and/or assemble displays. System 499 includes a camera 470, processing logic 480, and a printing apparatus 490. Printing apparatus may utilize ink-jet printing technology, for example. Camera 470 is configured to capture an image 473 of illumination layer 410 of a display backlight. Image 473 may be a high-definition digital image that includes red-green-blue (RGB) subpixel values. Illumination layer 410 may be configured similarly to illumination layer 310, for example. The light sources (e.g. 313) of illumination layer 410 are activated (turned on) so that the light sources generate illumination light 415 while image 473 is captured by camera 470. The field-of-view of camera 470 includes the two-dimensional illumination area (e.g. 311) of illumination layer 410.

Processing logic 480 is configured to generate print data 483 in response to receiving image 473 from camera 470. Print data 483 includes at least one of the size, shape, coordinates, quantity of ink, or selection of ink (if different kinds of ink are utilized in printing ink patterns) for the ink patterns. Printing apparatus 490 is configured to print ink patterns (e.g. ink patterns 323) onto an optical layer 453 to increase the light uniformity across a two-dimensional illumination area of a display backlight. The ink patterns are custom printed onto optical layer 453 for the specific illumination layer 410 associated with image 473. When a second illumination layer is imaged by camera 470, different (custom) print data is generated in response to a second image captured of the second illumination layer so that ink patterns printed onto a second optical layer are custom matched for the second illumination layer so that the ink patterns increase light uniformity for that specific illumination layer since the brightness and/or color output of the light sources of different illumination layers will be slightly different.

Processing logic 480 may be implemented as a microcontroller, processor, field-programmable gate array (FPGA), or a computer, for example. Processing logic 480 may analyze image 473 for brightness uniformity and/or color uniformity of illumination light 415 across a two-dimensional illumination area. For bright light sources, an increased size or quantity of an ink pattern may be specified for an ink pattern over a light source that is particularly bright. Processing logic 480 may analyze the RGB subpixel values of image 473 at the coordinates corresponding to each light source to determine the color spectrum of the illumination light emitted by each light source 313. For a light source that requires color modulation to a pre-defined color uniformity, the selection of ink (e.g. different inks may be select to modulate different wavelengths of light) or quantity of ink may be included in the print data 483 for each ink pattern so that each ink pattern modulates the illumination light emitted by a corresponding light source and the display light can be modulated to the pre-defined color uniformity.

Printing apparatus 490 is configured to receive optical layer 453 and print the ink patterns onto optical layer 453 to generate patterned optical layer 457 in response to receiving printing data 483. Optical layer 453 may be a diffuser. Printing data 483, and therefore patterned optical layer 457 is specific to the image 473 captured of the specific illumination layer 410 because each illumination layer 410 will have light sources with slightly different light outputs. Thus, patterned optical layer 457 is coupled with the specific illumination layer 410 that the patterned optical layer 457 was custom printed for to form display backlight 460, in FIG. 4. With patterned optical layer 457 having ink patterns custom matched to the light sources of illumination layer 410, display backlight 460 generates refined display light 465 that has increased light uniformity with respect to brightness and/or color.

After display backlight 460 is formed, an SLM 430 may be coupled to display backlight 460 to form display 400 that generates image light 435. Since SLM 430 is illuminated by refined display light 465 having increased light uniformity, image light 435 will also having increased light uniformity with respect to brightness and/or color. This increased light uniformity may be of particular value to displays that are less than 10 inches diagonal when compared with larger form factor displays such as televisions and computer monitors, for example. In the particular context where a display such as display 400 is utilized in an HMD, the increased light uniformity of image light 435 may be of particular importance, given the close viewing distance and potential magnification of viewing optics included in the HMD.

Figure 5:
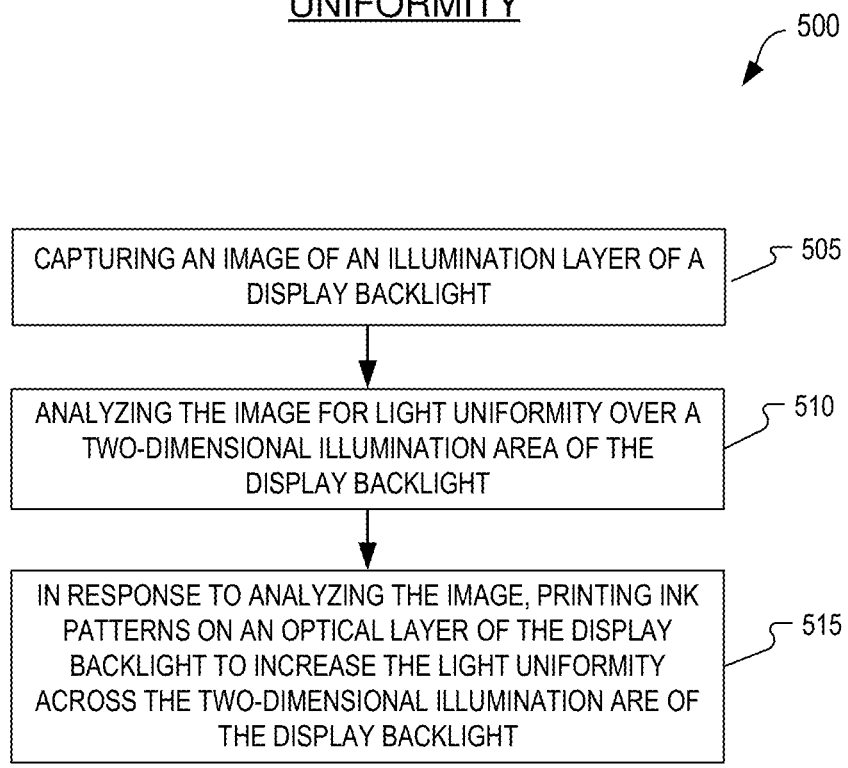
FIG. 5 illustrates an example process of increasing light uniformity in a display backlight, in accordance with an embodiment of the disclosure.

FIG. 5 illustrates an example process 500 of increasing light uniformity in a display backlight, in accordance with aspects of the disclosure. The order in which some or all of the process blocks appear in process 500 should not be deemed limiting. Rather, one of ordinary skill in the art having the benefit of the present disclosure will understand that some of the process blocks may be executed in a variety of orders not illustrated, or even in parallel. One or more aspects of process 500 may be performed by system 499, for example In process block 505, an image (e.g. image 473) is captured of an illumination layer of a display backlight.

In process block 510, the image is analyzed for light uniformity over a two-dimensional illumination area of the display backlight.

In response to analyzing the image, ink patterns are printed on an optical layer for the display backlight to increase the light uniformity across the two-dimensional illumination are of the display backlight, in process block 515. The optical layer may be a diffuser layer that will be positioned to be illuminated by a two-dimensional array of light sources (e.g. light sources 313). In an embodiment, the printed ink patterns include a yellow phosphor configured to be excited by blue illumination light from a two-dimensional array of light sources that emit the blue illumination light.

The display backlight may be a direct-lit backlight having a two-dimensional array of light sources included in the illumination layer. The light sources may include LEDs configured to emit white light.

In an embodiment, the light uniformity of process block 515 includes brightness uniformity and analyzing the image includes analyzing the brightness uniformity over the two-dimensional illumination area of the display backlight. Printing ink patterns may include increasing a quantity of the ink printed above bright-spots in the two-dimensional area as a function of the brightness of the bright-spots.

In an embodiment, the light uniformity of process block 515 includes color uniformity and analyzing the image includes analyzing the color uniformity of the two-dimensional illumination area of the display backlight compared to a pre-defined designed color spectrum for the display backlight. In some embodiment, printing ink patterns includes modulating a color of the ink at different coordinates within the two-dimensional illumination area to homogenize a color spectrum of light emitted by the display backlight. In some embodiments, printing ink patterns includes increasing a quantity of the ink printed at different coordinates within the two-dimensional illumination area to homogenize a color spectrum of light emitted by the display backlight. The ink patterns may be printed to increase both the brightness uniformity and the color uniformity of the light emitted by the display backlight.

In an embodiment, process 500 further includes pairing the optical layer with the illumination layer that was imaged to generate the image of process block 505. The optical layer includes the ink patterns that were printed on the optical layer in response to analyzing the image with the two-dimensional illumination area of the display backlight. Process 500 may further include fabricating a display (e.g. display 400) where fabricating the display includes adding an LCD to the display backlight (e.g. 460) that includes the two-dimensional illumination area paired with the optical layer that includes the ink patterns.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. 480) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A method of increasing light uniformity of a display backlight, the method comprising:
    capturing an image of illumination light from light sources of an illumination layer, wherein the illumination layer is a first layer of a display backlight;
    analyzing the image of the illumination light to identify light variations between the light sources of the illumination layer of the display backlight;
    printing, in response to analyzing the image, ink patterns on an optical layer, wherein each of the ink patterns match with a corresponding one of the light sources; and
    disposing the optical layer over the illumination layer as a second layer of the display backlight, to increase light uniformity of the display backlight.

2. The method of claim 1, wherein the optical layer is a diffuser layer positioned to be illuminated by a two-dimensional array of the light sources.

3. The method of claim 1, wherein ink included in the ink patterns includes a yellow phosphor configured to be excited by blue illumination light from a two-dimensional array of the light sources.

4. The method of claim 1, wherein the display backlight is smaller than 10 inches diagonal.

5. The method of claim 1 further comprising:
    fabricating a display, wherein fabricating the display includes adding a liquid crystal display (LCD) to the display backlight that includes the illumination layer paired with the optical layer that includes the ink patterns.

6. The method of claim 1, wherein the display backlight is a direct-lit backlight, wherein the light sources are a two-dimensional array of light sources.

7. The method of claim 6, wherein the light sources include light emitting diodes (LEDs) configured to emit white light.

8. The method of claim 1, wherein the light uniformity includes brightness uniformity, and wherein analyzing the image includes analyzing the brightness uniformity of the image over a two-dimensional illumination area of the display backlight.

9. The method of claim 8, wherein printing ink patterns includes increasing a quantity of ink printed above bright-spots in the two-dimensional illumination area as a function of a brightness of the bright-spots.

10. The method of claim 1, wherein the light uniformity includes color uniformity, and wherein analyzing the image includes analyzing the color uniformity of a two-dimensional illumination area of the display backlight compared to a pre-defined designed color spectrum for the display backlight.

11. The method of claim 10, wherein printing ink patterns includes modulating a color of ink at different coordinates within the two-dimensional illumination area to homogenize a color spectrum of light emitted by the display backlight.

12. The method of claim 10, wherein printing ink patterns includes increasing a quantity of ink printed at different coordinates within the two-dimensional illumination area to homogenize a color spectrum of light emitted by the display backlight.

13. A method of increasing light uniformity of a display backlight, the method comprising:
    capturing an image of an illumination layer, wherein the illumination layer is a first layer of a display backlight;
    analyzing the image for light uniformity over a two-dimensional area of the display backlight;
    printing, in response to analyzing the image, ink patterns on an optical layer, wherein the optical layer is a second layer of the display backlight; and
    providing the optical layer over the illumination layer to increase the light uniformity across the two-dimensional area of the display backlight,
    wherein the light uniformity includes color uniformity, and wherein analyzing the image includes analyzing the color uniformity of the two-dimensional area of the display backlight compared to a pre-defined designed color spectrum for the display backlight.

14. The method of claim 13, wherein printing ink patterns includes modulating a color of ink at different coordinates within the two-dimensional area to homogenize a color spectrum of light emitted by the display backlight.

15. The method of claim 13, wherein printing ink patterns includes increasing a quantity of ink printed at different coordinates within the two-dimensional area to homogenize a color spectrum of light emitted by the display backlight.

16. The method of claim 13, wherein the display backlight is a direct-lit backlight having a two-dimensional array of light sources.

17. The method of claim 16, wherein the light sources include light emitting diodes (LEDs) configured to emit white light.

18. The method of claim 13, wherein the light uniformity includes brightness uniformity, and wherein analyzing the image includes analyzing the brightness uniformity of the image over the two-dimensional area of the display backlight.

19. The method of claim 18, wherein printing ink patterns includes increasing a quantity of ink printed above bright-spots in the two-dimensional area as a function of a brightness of the bright-spots.

20. A backlight unit for a display comprising:
    a two-dimensional array of light sources configured to emit illumination light;
    an optical layer positioned to be illuminated by the illumination light; and
    ink patterns printed on the optical layer, wherein the ink patterns are matched to the light sources to increase light uniformity across a two-dimensional illumination area of the backlight unit.

21. The backlight unit of claim 20, wherein the optical layer is a diffuser, and wherein a quantity of ink included in a particular ink pattern increases as a brightness of a corresponding light source that the particular ink pattern is matched to increases.

22. The backlight unit for a display of claim 20, wherein each of the ink patterns is dispose above a corresponding light source in the two-dimensional array of light sources.

23. The backlight unit of claim 20, wherein the light sources include a light-emitting-diode (LED) configured to emit blue illumination light, and wherein the optical layer includes quantum dots to be excited by the blue illumination light, the quantum dots configured to emit white display light when excited by the blue illumination light.

24. The backlight unit of claim 23, wherein the quantum dots are printed onto the optical layer as the ink patterns to increase the light uniformity.

\* \* \* \* \*